US006651892B2

United States Patent
Hooglander

(10) Patent No.: US 6,651,892 B2
(45) Date of Patent: *Nov. 25, 2003

(54) SYSTEM AND METHOD FOR CARRYING MEDICAL AND/OR PERSONAL INFORMATION

(76) Inventor: Peter Hooglander, P.O. Box 944, Patchogue, NY (US) 11772

( * ) Notice: Subject to any disclaimer, the term of this patent is extended or adjusted under 35 U.S.C. 154(b) by 0 days.

This patent is subject to a terminal disclaimer.

(21) Appl. No.: 10/178,571

(22) Filed: Jun. 25, 2002

(65) Prior Publication Data

US 2002/0166897 A1 Nov. 14, 2002

Related U.S. Application Data

(63) Continuation of application No. 09/277,181, filed on Mar. 26, 1999, now Pat. No. 6,419,158.
(60) Provisional application No. 60/079,627, filed on Mar. 27, 1998.

(51) Int. Cl.⁷ .................................................. G06K 19/06
(52) U.S. Cl. ..................... 235/492; 206/37; 206/307; 206/470; 235/487
(58) Field of Search ................................. 235/492, 487; 206/307, 37, 37.7, 39.7, 486, 470; 63/1.11, 1.14, 12, 13, 18, 19, 20; 438/121

(56) References Cited

U.S. PATENT DOCUMENTS

| 3,989,035 A | 11/1976 | Zuehlsdorff |
| 4,249,330 A | 2/1981 | Chioffe |
| 4,280,287 A | 7/1981 | Gulbransen |
| 4,327,512 A | 5/1982 | Oliver |
| 4,444,515 A | 4/1984 | Clark |
| 4,471,539 A | 9/1984 | Mann |
| 4,483,626 A | 11/1984 | Noble |
| 4,485,496 A | 12/1984 | Shanks, Jr. |

(List continued on next page.)

OTHER PUBLICATIONS

Dallas Semiconductor, entire reference, Feb. 2, 1994.

* cited by examiner

Primary Examiner—Michael G. Lee
Assistant Examiner—Jamara A. Franklin
(74) Attorney, Agent, or Firm—Clark & Brody

(57) ABSTRACT

A system and method for carrying personal and/or medical information includes a locket designed to contain a memory electronic device to store information about the user. The locket is design to be opened to provide ready access to a machine readable portion of the memory device by a reader. The locket is combined with a pocket in a shoe to carry the locket unobtrusively. The locket and pocket can include a logo which will alert medical or other emergency personnel as to the existence of the locket during an emergency.

19 Claims, 4 Drawing Sheets

U.S. PATENT DOCUMENTS

| | | |
|---|---|---|
| 4,507,882 A | 4/1985 | Harrell |
| 4,611,416 A | 9/1986 | Lin |
| 4,630,383 A | 12/1986 | Gamm |
| 4,635,646 A | 1/1987 | Gilles et al. |
| 4,638,579 A | 1/1987 | Gamm |
| 4,697,363 A | 10/1987 | Gamm |
| 4,852,276 A | 8/1989 | Savoca et al. |
| 4,897,947 A | 2/1990 | Kass-Pious |
| 4,984,683 A | 1/1991 | Eller |
| 5,004,899 A | 4/1991 | Ueda |
| 5,094,016 A | 3/1992 | DiVito |
| 5,311,679 A | 5/1994 | Birch, Sr. |
| 5,367,795 A | 11/1994 | Iverson et al. |
| 5,479,796 A | 1/1996 | Shimano |
| 5,596,821 A | 1/1997 | Solo |
| 5,602,918 A | 2/1997 | Chen et al. |
| 5,710,421 A | 1/1998 | Kokubu |
| 5,802,876 A | 9/1998 | Miller et al. |
| 5,877,742 A | 3/1999 | Klink |
| 5,978,493 A * | 11/1999 | Kravitz et al. .............. 382/115 |
| 6,021,306 A | 2/2000 | McTaggart |
| D432,939 S | 10/2000 | Hooglander |
| 6,155,409 A | 12/2000 | Hettinger |
| 6,223,559 B1 | 5/2001 | Coleman |
| 6,268,796 B1 | 7/2001 | Gnadinger et al. |
| 6,419,158 B2 * | 7/2002 | Hooglander ................ 235/492 |

SYSTEM AND METHOD FOR CARRYING MEDICAL AND/OR PERSONAL INFORMATION

CROSS REFERENCE TO RELATED APPLICATIONS

This application is a continuation of U.S. patent application Ser. No. 09/277,181, which was filed on Mar. 26, 1999, now U.S. Pat. No. 6,419,158 and claims the benefit of U.S. provisional application No. 60/079,627, which was filed on Mar. 27, 1998.

FIELD OF THE INVENTION

The present invention is directed to a system and a method for carrying medical and/or personal information and, in particular, to a system and a method which utilizes a locket having a memory chip with the medical information stored therein, and a shoe adapted to carry the locket.

BACKGROUND ART

In the prior art, various means have been proposed for individuals to carry medical information on their person. One technique is the wearing of a medical alert bracelet. This technique is not universally accepted since many individuals do not like the stigma associated with wearing an indicator that an individual has a particular medical condition.

Other ways to carry medical information include lockets containing a written, typed or printed tabulation of a person's medical condition. These lockets could be used with necklaces, wrist bands, or other modes of attachment. One drawback with these systems is the limited amount of information that can be carried on a written or printed form.

Medical information can also be stored on cards which are held in an individual's wallet or purse. The cards may hold the information in printed form or electronic memory form. The problem with this technique is that many medical personnel are prohibited from searching an individual's wallet or purse for reasons of privacy. Thus, carrying medical information in these locations may not permit an emergency medical person to obtain the information if the person is incapacitated.

In view of the disadvantages associated with the prior art techniques noted above, a need exists to provide an improved system and method for carrying medical information for an individual. The present invention solves this need through the use of a low-cost locket which carries medical information in an electronic memory chip. The locket is designed to interface easily with readers that can access the electronic information. The invention also provides a system whereby the locket can be discretely stored on a person's shoe so that it is readily obtainable by emergency medical personnel.

SUMMARY OF THE INVENTION

A first object of the present invention is to provide an improved system and method for individuals to carry medical information.

Another object of the invention is to provide a shoe with a pocket associated therewith, the pocket sized to receive a locket carrying the medical information electronically.

Another object of the invention is a locket which is designed to interface with readers which can access the locket's electronically stored medical information.

Another object of the invention is the mode of configuring the device storing the electronic medical information to facilitate reading the information by an electronic reading device.

In satisfaction of the foregoing objects and advantages, the present invention includes a method of providing information about a user including the steps of providing a locket enclosing a memory chip, the memory chip storing information about the user. The locket is opened to expose a machine-readable portion of the memory chip. The machine-readable portion of the chip is fed into a reader to access the information stored in the memory chip. The locket can be stored in a pocket of a shoe and the locket and/or shoe can indicate the presence of the locket in the pocket by placing indicia on the pocket/locket representative of medical information. The locket can be secured to a portion of the shoe using a flexible line such as a chain or the like. The memory chip can be removed from the locket for reading, particularly by using a removable support linked to the locket, removal of the support permitting reading of the memory chip by the reader.

The invention also includes a system for carrying information of a user comprising a locket having a lid, opening of the lid exposing an inside portion of the locket. The memory chip is attached to the inside portion and has storage capacity to store information about the user. The memory chip has a machine-readable portion so that the information can be accessed by a reader. The system can also include means for attaching the locket to the user.

The system also comprises a shoe with a pocket, the pocket sized to store the locket. A means for attaching the locket to a portion of the shoe can also be provided such as a flexible member or the like, e.g., a chain, wire, cord, etc. In one embodiment, the locket comprises two halves, a surface of one half containing the memory chip and being aligned in generally the same plane with a surface of the other half when the locket is opened for memory chip reading. The memory chip can be mounted on a support that is extendable from the locket for memory chip reading. The support can be foldable for storing in the locket when the locket is closed. The locket and/or the shoe pocket can have a logo on an exterior surface thereof to indicate a medical condition.

DESCRIPTION OF THE PREFERRED EMBODIMENTS

Figure 1A:
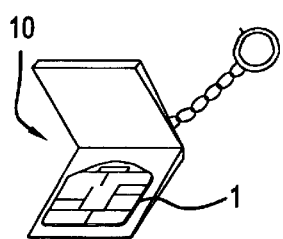
FIGS. 1A–1E show a first embodiment of the inventive locket.
Figure 1B:
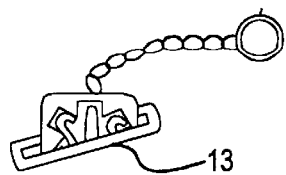
Figure 1C:
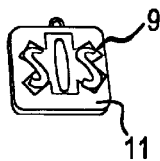
Figure 1D:
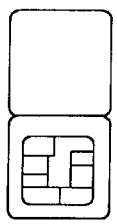
Figure 1E:
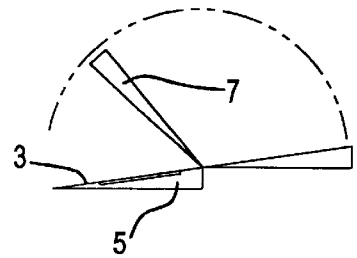
Figure 2A:
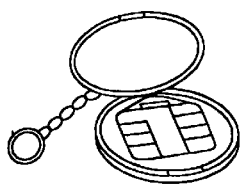
FIGS. 2A–2E show a second embodiment of the inventive locket.
Figure 2B:
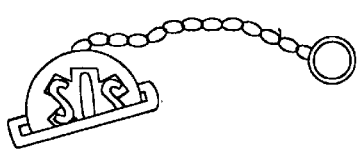
Figure 2C:
Figure 2D:
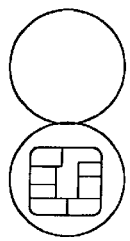
Figure 2E:
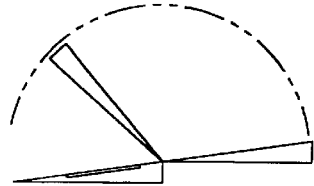
Figure 3A:
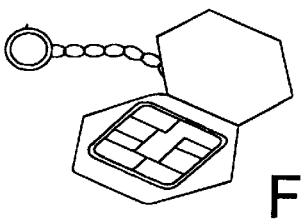
FIGS. 3A–3E show a third embodiment of the inventive locket.
Figure 3B:
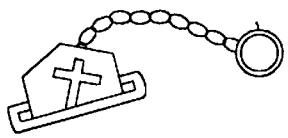
Figure 3C:
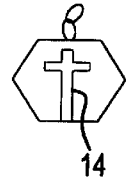
Figure 3D:
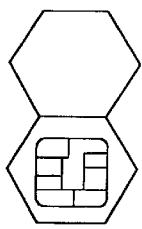
Figure 3E:
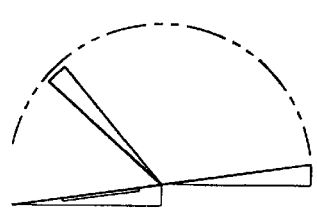

FIGS. 1A–1E show a first embodiment of the inventive locket depicting a square shape with or without a logo. The locket shape is generally square in shape and is shown with a chain and connector ring in FIG. 1A. The locket 10 has an electronic memory chip 1 embedded in the surface 3 thereof. The locket is comprised of two halves 5 and 7 which can be opened and closed as shown in FIG. 1E.

A logo 9 can be placed on the outer surface 11 if so desired. FIG. 1B shows the locket partially obscured when placed in a pocket 13.

FIGS. 2A–2E show a similar locket, but having a circular shape with or without the logo 9.

FIGS. 3A–3E show a hexagonal-shaped locket with an alternative logo 14 on the outer surface thereof.

Figure 4:
FIG. 4 shows an enlarged side view of the locket of FIG. 1A.
Figure 5:
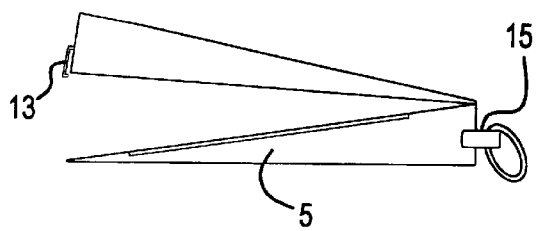
FIG. 5 shows a side view of the locket of FIG. 4 partially opened.

Referring to FIGS. 4–8B, the locket shown in FIG. 1A is illustrated in greater detail. Whether the locket is round, square, or hexagonal, the side view is the same as is the mechanical structure. Generally, the square and hexagonal shapes are stronger than the circular shape due to hinge length. FIG. 5 more clearly shows the clasp 13 which hooks to the locket half 5 to keep the locket in a closed position. These figures also illustrate the chain attachment 15.

Figure 6:
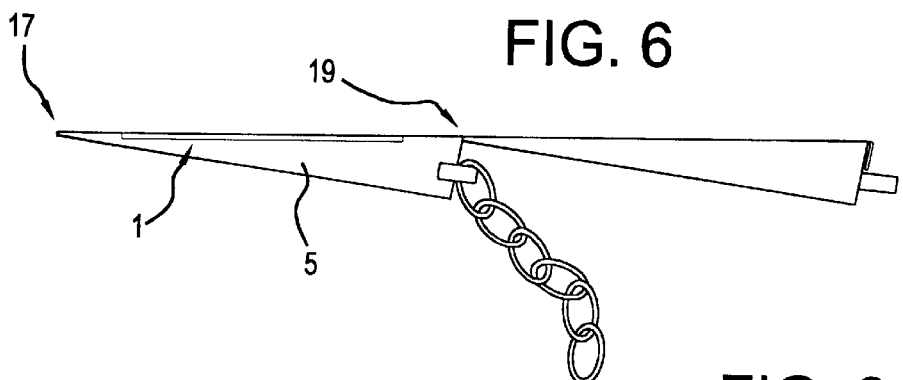
FIG. 6 shows a side view of the locket of FIG. 4 completely opened.
Figure 8A:
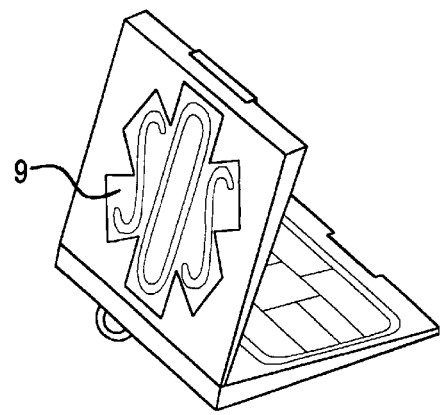
FIGS. 8A and 8B shows other perspective views of the locket of FIG. 4.

FIG. 6 shows the locket completely opened. In this configuration, the distal end 17 of the locket half 5 can be easily inserted into an EPROM chip reader (not shown) so that the chip 1 can be read.

Figure 7:
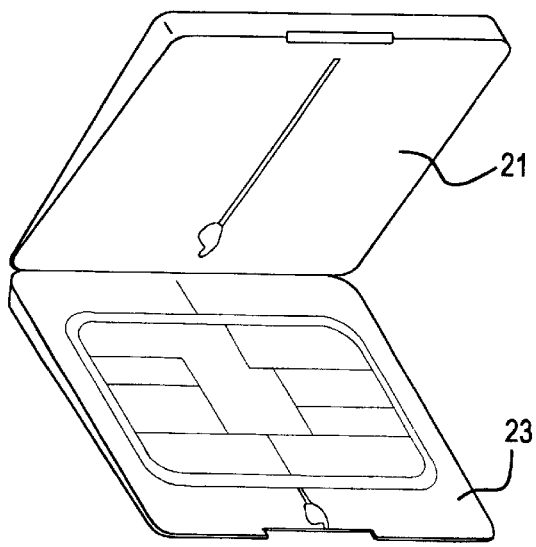
FIG. 7 shows a perspective and inside view of the locket of FIG. 4.
Figure 8B:
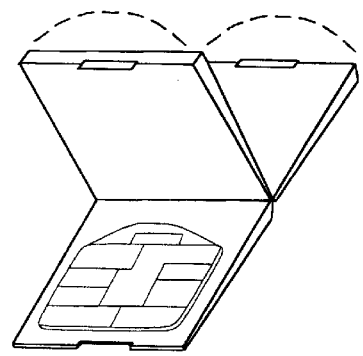

The square locket shown in FIGS. 4–8B offer certain advantages in the length of the hinge 19. The longer hinge as compared to the hinge shown in FIG. 2D offers more structural strength. The locket as shown in FIG. 7 can also have indicia on the inner surfaces 21 and 23 to assist a user when inserting the locket half 5 into a reader. The locket in FIG. 8 has the logo 9 on the outside.

It should be understood that any type of a memory chip can be used with the foldable locket shown in FIGS. 1A–8B. The chip could be recessed as shown in FIG. 6 or placed on the surface 23 so that it is a partially raised condition, if so desired. In addition, other geometric shapes could be used besides the square, circle and hexagonal configurations shown in FIGS. 1A–3E. However, these shapes are preferred since they would result in reduced manufacturing costs. Other mechanisms can be used in place of the clasp 13 to keep the halves 5 and 7 together as would be within the skill of the art, e.g., a pin and complementary sized receiving hole or the like.

The locket is preferably made of a plastic material so that it is low cost and lightweight. FIG. 4 shows exemplary dimensions. Of course, other materials could be used as would be within the skill of the art.

Using the locket entails first storing the necessary medical information on the chip 1. This can be done at the appropriate medical center or office which has the means to receive the information, convert it into an electronic form and store it on the chip. These means are readily available and do not require further description for understanding of the invention. Once the information is stored on the chip, the individual can carry the locket with the information in any manner, for example, on a necklace, in a pocket, on a wristband or the like. The locket can also be carried as described below on a shoe. With the information stored in the chip, the locket can then be opened by a medical technician, doctor or the like when the carrier is incapacitated. The half 5 can then be positioned in the appropriate manner so that a reader can read the information and the individual can be treated in light of his/her pre-existing condition.

Figure 9:
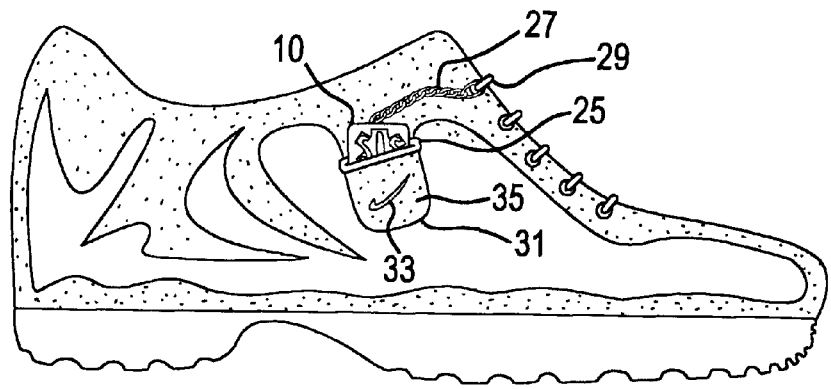
FIG. 9 shows the locket of FIGS. 1A–1E in a first shoe type.

To solve the problem of discretely hiding the locket while still making it accessible to medical personnel, a shoe can be provided with a pocket. One embodiment of the shoe with pocket is shown in FIG. 9 wherein the actual pocket is formed either within the shoe interior or between the inner and outer shoe layers. In this embodiment, only the pocket slot 25 is visible. The locket 10 is shown secured via the chain 27 to the lace 29. In this embodiment, the pocket can be outlined by stitching 31 and a logo 33 can be placed on the pocket surface 35. The pocket can be sized so that at least a portion of the locket 10 extends outwardly therefrom so it can be grabbed by an individual for access to the electronic memory chip contained therein.

Figure 10:
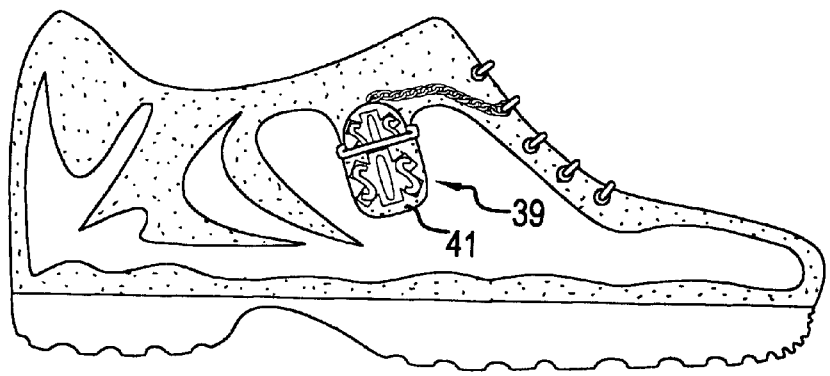
FIG. 10 shows the locket of FIGS. 2A–2E in a second shoe type.

FIG. 10 shows an alternative shoe with pocket wherein the pocket is located on the exterior of the shoe. The pocket 39 shown in FIG. 10 is attached to the shoe by stitching 41.

Alternatively, the pocket could be attached by a removable fastener arrangement such as hook and loop fasteners. In this embodiment, the pocket and the fastening means could be sold with a shoe and the purchaser of the shoe could then attach the fastening means of pocket to the shoe if so desired. The fastening means could be secured to the shoe with an adhesive or tape or other means so that the pocket can be secured to the shoe after purchase.

In yet another embodiment, the shoe could be manufactured with the fastening means as a part thereof and the pocket could then be removably attached thereto, if so desired.

Figure 11:
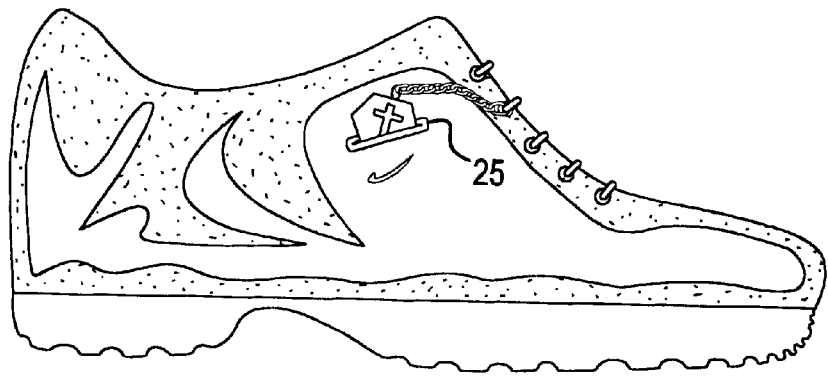
FIG. 11 shows the locket of FIGS. 3A–3E in a third shoe type.
Figure 12:
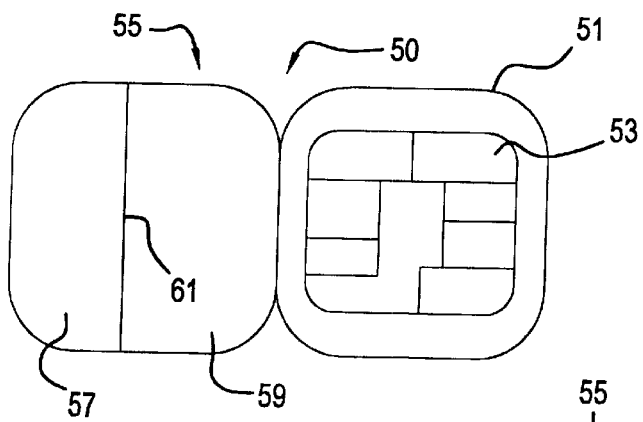
FIG. 12 shows a top view of a memory chip assembly according to the invention.
Figure 13:
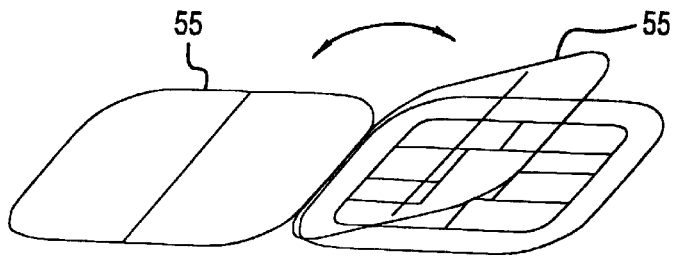
FIG. 13 shows a perspective view of the assembly of FIG. 12.
Figure 14:
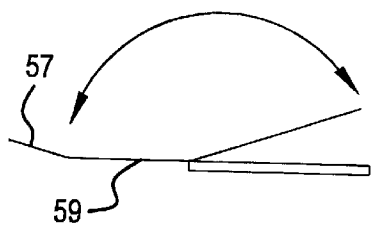
FIG. 14 shows a side view of the assembly or FIG. 12.
Figure 15:
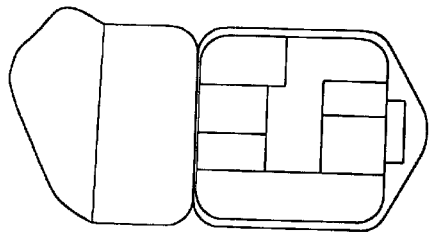
FIG. 15 shows a top view of the assembly of FIG. 14.

FIG. 11 shows a further embodiment wherein the pocket 25 is associated with the shoe but lacks the stitching depicted in FIG. 9.

The pocket configuration shown in FIGS. 9 and 10 could vary. For example, the stitching outline shown in FIG. 9 could take on another shape, e.g., more oval, more angular or the like.

Figure 16:
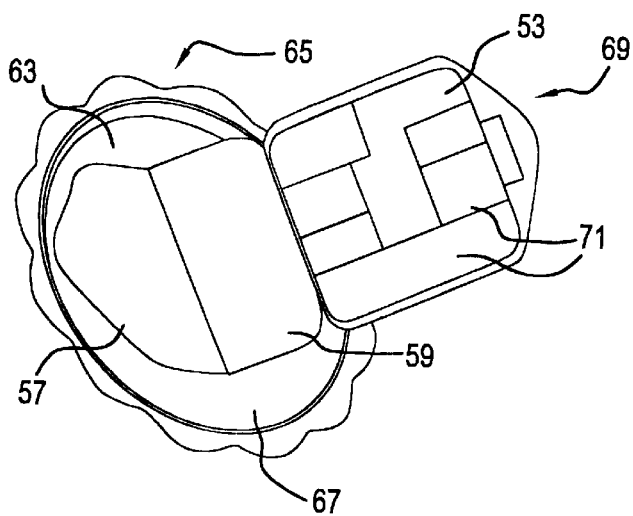
FIG. 16 shows a perspective view of the assembly of FIG. 12 in a locket.
Figure 17:
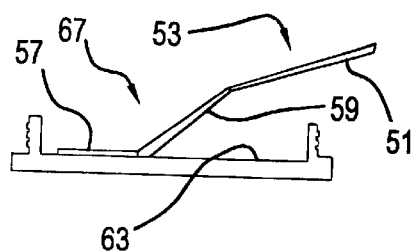
FIG. 17 shows a side view of the assembly and locket of FIG. 16.

Another embodiment of the invention entails a unique method for securing the E2PROM chip to a locket for easier reading. FIGS. 12–17 show a memory chip assembly 50 comprising a support including a substrate 51 with the chip 53 thereon. The chip 53 can be part of a credit card type card which is typically sized at 54 mm×86 mm. The thickness of the chip on a typical card is 0.8 mm and the card is usually 1.2 mm thick. The chip could have a security lock if so desired. The actual measurement of the chip could be larger to fit within a given locket. The inserted chip could have different shapes. As noted above, one design is shown in FIGS. 12–17. In this design, the substrate 51 is hinged to a base section 55. The base section 55 comprises two parts, 57 and 59, each separated by the crease or fold line 61. The base section 57 is designed to attach to the inside surface 63 of a capsule or locket 65, see FIG. 16. The attachment can be by an adhesive or the like. With base section 67 attached to the capsule surface 63, the substrate 51 can be extended from the capsule recess as shown in FIG. 16 to permit the chip 53 to be read by a reader. With this folding action, 75% of the substrate 51-base section 55 can be extended for chip reading. The chip can be glued to the substrate 51.

Other arrangements could be utilized providing that the chip 53 can be removed from the recess 67 so that it can be read, while still being replaced with the folding action as illustrated in FIGS. 13–16.

While the above listed embodiments illustrate a chip that is inserted into a reader, other chips can be used as would be within the skill of the art. For example, a chip which only needs to be placed in the vicinity of a reader could be used as part of the inventive locket, system and method of obtaining medical information, e.g., an electronic send-receive devices using airwaves. With these devices, the memory device can transmit the information to a receiver/reader rather than use electrical contact between the device and the reader. In addition, the memory capacity of the chip can vary, e.g., 4 K, 8 K, 10 K and more bytes.

The chip may also include an alignment feature 69, see FIG. 16. This feature 69 is intended to ensure that the chip is aligned with the reader when accessing the medical information. Typically, the chip will have different segments 71 which engage respective contacts of the reader. The chip and reader must be properly aligned so that the contacts of the reader engage the right segments of the chip. The feature 69 ensures that the chip is aligned to mate with the reader in the proper orientation. Of course, the reader will also have some indicia so that the feature 69 is arranged with respect to the reader in the proper manner. Other means or indicia can be utilized to assure proper alignment between the reader and the chip can be employed as would be within the skill of the art.

While the invention is described in terms of storing medical information, any type of information can be stored in the electronic memory of the device described above, e.g., personal information, organ donor information or the like. As such, an invention has been disclosed in terms of preferred embodiments thereof which fulfills each and every one of the objects of the present invention as set forth above and provides new and improved system and method for carrying information about a user.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A method of providing information about a user comprising the steps of:
   a) providing a locket enclosing a memory chip, the memory chip storing information about the user, and supporting the locket on the user so that the locket is accessible to obtain information stored in the memory chip;
   b) opening the locket to expose a machine-readable portion of the memory chip;
   c) inserting the machine-readable portion of the locket into a reader to access the information stored in the memory.

2. The method of claim 1, wherein the locket is stored in a pocket of a shoe.

3. The method of claim 2, comprising indicating the presence of the locket in the pocket by placing indicia on the pocket representative of medical information.

4. The method of claim 2, comprising attaching the locket to a portion of the shoe.

5. The method of claim 1, wherein the memory chip is removed from the locket for reading.

6. The method of claim 1, wherein the locket has a flexible member attached thereto for support.

7. The method of claim 6, wherein the flexible member is one of a chain sized to link to a user's shoe, or a chain sized to attach to a part of the user's body.

8. The method of claim 1, wherein the supporting step exposes at least a portion of the locket for access.

9. A system for carrying information of a user comprising:
   a) a locket having a lid, opening of the lid exposing an inside portion of the locket, the locket further comprising a support connected to the locket and permitting the locket to be worn by the user so that information about the user is accessible;
   b) a memory chip attached to the inside portion and having a storage capacity to store information about the user, the memory chip having a machine-readable portion so that the information can be accessed by a reader.

10. The system of claim 9, wherein the support is a flexible member, and at least one end is linked to the locket.

11. The system of claim 10, comprising a shoe with a pocket, the pocket sized to store the locket, the support further comprising a flexible member for attaching the locket to a portion of the shoe.

12. The system of claim 10, wherein the flexible member is one of a chain sized to link to a user's shoe, or a chain sized to attach to a part of the user's body.

13. The system of claim 9, comprising a shoe with a pocket, the pocket sized to store the locket.

14. The system of claim 9, wherein the locket comprises two halves, a surface of one half containing the memory chip and being aligned in generally the same plane with a surface of the other half when the locket is opened for memory chip reading.

15. The system of claim 9, wherein the locket comprises two halves, the memory chip located on one half, each half being generally triangular in cross section so that the locket is generally one of square and rectangular in cross section when the locket is closed.

16. The system of claim 9, wherein the locket has a logo on an exterior surface.

17. The system of claim 9, wherein a logo is on one of an exterior surface of the locket and a portion of the shoe.

18. The system of claim 9, wherein the information contained by the memory chip is medical information about the user.

19. The system of claim 9, wherein the support is such that at least a portion of the locket is exposed for access when worn by a user.

* * * * *